United States Patent
Zhang et al.

(10) Patent No.: US 10,237,006 B2
(45) Date of Patent: Mar. 19, 2019

(54) SPECTRUM DETECTION METHOD AND APPARATUS, AND BASE STATION

(71) Applicant: HUAWEI TECHNOLOGIES CO., LTD., Shenzhen (CN)

(72) Inventors: Jian Zhang, Shanghai (CN); Qinghai Zeng, Shanghai (CN); Qufang Huang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 304 days.

(21) Appl. No.: 15/205,340

(22) Filed: Jul. 8, 2016

(65) Prior Publication Data

US 2016/0323049 A1 Nov. 3, 2016

Related U.S. Application Data

(63) Continuation of application No. PCT/CN2014/070481, filed on Jan. 10, 2014.

(51) Int. Cl.
  *H04W 72/00* (2009.01)
  *H04B 17/345* (2015.01)
  *H04W 16/14* (2009.01)

(52) U.S. Cl.
  CPC .......... *H04B 17/345* (2015.01); *H04W 16/14* (2013.01)

(58) Field of Classification Search
  CPC .. H04W 16/14; H04W 88/06; H04W 72/0453
  See application file for complete search history.

(56) References Cited

U.S. PATENT DOCUMENTS

| | | | |
|---|---|---|---|
| 9,071,345 B2 * | 6/2015 | Bai | H04W 52/0219 |
| 2009/0323835 A1 | 12/2009 | Rao et al. | |

(Continued)

FOREIGN PATENT DOCUMENTS

| | | |
|---|---|---|
| CN | 101729165 A | 6/2010 |
| CN | 101902251 A | 12/2010 |

(Continued)

OTHER PUBLICATIONS

International Search Report dated Sep. 26, 2014 in corresponding International Application No. PCT/CN2014/070481.

(Continued)

*Primary Examiner* — Shantell L Heiber
(74) *Attorney, Agent, or Firm* — Staas & Halsey LLP

(57) ABSTRACT

Embodiments of the present invention provide a spectrum detection method and apparatus, and a base station. According to the method, in the embodiments, a first base station sends spectrum detection information to an auxiliary device, where the spectrum detection information is used to instruct the auxiliary device to detect whether a first spectrum is occupied; then, the first base station receives first spectrum status information sent by the auxiliary device, so that the first base station determines whether the first spectrum in an area in which the auxiliary device is located is occupied. Therefore, it is implemented that the first base station may determine whether user equipment is interfered by another communications system device in a process in which the user equipment uses the first spectrum, so as to implement sharing of a spectrum by the user equipment with the another communications system device.

13 Claims, 6 Drawing Sheets

(56) References Cited

U.S. PATENT DOCUMENTS

| | | | |
|---|---|---|---|
| 2011/0312368 A1 | 12/2011 | Hamdi et al. | |
| 2012/0076061 A1 | 3/2012 | Desai | |
| 2012/0120887 A1* | 5/2012 | Deaton .............. | H04W 16/14 370/329 |
| 2013/0064103 A1* | 3/2013 | Koskela ............ | H04W 72/1284 370/252 |
| 2013/0310062 A1 | 11/2013 | Liu et al. | |

FOREIGN PATENT DOCUMENTS

| | | |
|---|---|---|
| CN | 102077537 A | 5/2011 |
| CN | 102624465 A | 8/2012 |
| CN | 103052095 A | 4/2013 |
| EP | 2 670 181 A2 | 12/2013 |
| KR | 10-0980677 | 9/2010 |
| WO | 2010/011796 A2 | 1/2010 |
| WO | 2013/022294 A2 | 2/2013 |

OTHER PUBLICATIONS

Chinese Notice of Allowance dated May 11, 2018, in corresponding Chinese Patent Application No. 201480000902.3, 4 pgs.
International Search Report dated Sep. 26, 2014 in corresponding International Patent Application No. PCT/CN2014/070481.
Chinese Office Action dated Sep. 5, 2016 in corresponding Chinese Patent Application No. 201480000902.3.
Extended European Search Report dated Nov. 9, 2016 in corresponding European Patent Application No. 14878150.3.
"Reconfigurable Radio Systems (RRS); Cognitive Pilot Channel (CPC)", ETSI TR 102 683 V1.1.1, European Telecommunications Standards Institute, Sep. 2009, France, pp. 1-38.

* cited by examiner

SPECTRUM DETECTION METHOD AND APPARATUS, AND BASE STATION

CROSS-REFERENCE TO RELATED APPLICATIONS

This application is a continuation of International Application No. PCT/CN2014/070481, filed on Jan. 10, 2014, which is hereby incorporated by reference in its entirety.

TECHNICAL FIELD

The present invention relates to the field of communications technologies, and in particular, to a spectrum detection method and apparatus, and a base station.

BACKGROUND

In modern communication, people effectively utilize a radio spectrum by using spectrum management, for example, people divide the spectrums into a licensed spectrum and an unlicensed spectrum. The unlicensed spectrum includes a frequency band that is used for an industrial, scientific, and medical (Industrial, scientific and medical, ISM for short) device.

With rapid development of a packet service and an intelligent terminal, a high speed service with a large data volume has an increasing requirement for a spectrum. A Long Term Evolution (long term evolution, LTE for short) system of the 3rd Generation Partnership Project (the 3rd generation partnership project, 3GPP for short) may be applied to the unlicensed spectrum, so as to effectively utilize an unlicensed spectrum resource, and improve available spectrum bandwidth of an LTE user.

However, the unlicensed spectrum is shared by many users, and these users may belong to different radio access technologies (radio access technology, RAT for short), such as radar, LTE, wireless fidelity (Wireless Fidelity, WiFi for short), and Bluetooth (bluetooth). As a result, LTE cannot determine whether the LTE user is interfered by another communications system device in a process in which the LTE user uses the unlicensed spectrum.

SUMMARY

The present invention provides a spectrum detection method and apparatus, and a base station, which are used to reduce interference between different communications system devices on a same spectrum.

According to a first aspect, an embodiment of the present invention provides a shared spectrum detection method, including:

sending, by a first base station, spectrum detection information to an auxiliary device, where the spectrum detection information is used to instruct the auxiliary device to detect and/or report whether a first spectrum is occupied; and receiving, by the first base station, first spectrum status information sent by the auxiliary device, so that the first base station determines whether the first spectrum in an area in which the auxiliary device is located is occupied.

In a first possible implementation manner, the receiving, by the first base station, first spectrum status information sent by the auxiliary device, so that the first base station determines whether the first spectrum in an area in which the auxiliary device is located is occupied includes:

determining, by the first base station according to the first spectrum status information, that the first spectrum is unoccupied; and determining, by the first base station, first transmit power on the first spectrum according to location information of the auxiliary device.

With reference to the first possible implementation manner of the first aspect, in a second possible implementation manner, the receiving, by the first base station, first spectrum status information sent by the auxiliary device includes:

receiving, by the first base station, the first spectrum status information that is sent by the auxiliary device by means of a scheduling request SR or a dedicated preamble.

With reference to an implementation manner of the first aspect, in a third possible implementation manner, the first spectrum status information is obtained by the auxiliary device after the auxiliary device detects according to a preset radio frame mode.

With reference to the third possible implementation manner of the first aspect, in a fourth possible implementation manner, the radio frame mode includes at least one radio frame, where the radio frame includes information about whether the first spectrum is available or information indicating that there is an opportunity to use the spectrum.

With reference to the first aspect and any of the first to the fourth possible implementation manners of the first aspect, in a fifth possible implementation manner, before the determining, by the first base station according to the first spectrum status information, whether the first spectrum in an area in which the auxiliary device is located is occupied, the method further includes:

sending, by the first base station, detection configuration information to the auxiliary device by using a second spectrum, so that the auxiliary device detects the first spectrum, where the detection configuration information includes at least one or any combination of frequency information, radio access technology RAT information, a detection type, a detection reporting period, or a detection result reporting trigger threshold that are of the first spectrum; or sending, by the first base station, detection configuration information to the auxiliary device by using the first spectrum and second transmit power, so that the auxiliary device detects the first spectrum, where the detection configuration information includes at least one or any combination of frequency information, radio access technology RAT information, a detection type, a detection reporting period, or a detection result reporting trigger threshold that are of the first spectrum; the second transmit power is transmit power that is on the first spectrum and that is obtained by the first base station according to detection performed by the first base station; and the second transmit power is less than or equal to the first transmit power.

With reference to the first aspect and any of the first to the fifth possible implementation manners of the first aspect, in a sixth possible implementation manner, before the sending, by a first base station, spectrum detection information to an auxiliary device, the method further includes:

sending, by the first base station, a signal by using the second transmit power, where the second transmit power is the transmit power that is on the first spectrum and that is obtained by the first base station according to detection performed by the first base station; the second transmit power is less than or equal to the first transmit power; and the signal includes at least one of a primary synchronization signal PSS, a secondary synchronization signal SSS, a cell-specific reference signal CRS, and a channel state information reference signal (channel state information reference signal) CSI-RS.

With reference to the first possible implementation manner of the first aspect, in a seventh possible implementation manner, after the receiving, by the first base station, first spectrum status information sent by the auxiliary device, so that the first base station determines whether the first spectrum in an area in which the auxiliary device is located is occupied, the method further includes:

sending, by the first base station, a signal by using the first transmit power, where the signal includes a synchronization signal PSS, a secondary synchronization signal SSS, a reference signal CRS, and a channel state information reference signal CSI-RS.

With reference to the first aspect and any of the first to the seventh possible implementation manners of the first aspect, in an eighth possible implementation manner, the auxiliary device is disposed within a coverage area or at a coverage edge of a cell to which the first base station corresponds on the first spectrum, or the auxiliary device is disposed within a coverage area or at a coverage edge of a cell to which the first base station corresponds on the second spectrum.

With reference to the eighth possible implementation manner of the first aspect, in a ninth possible implementation manner, before the determining, by the first base station according to the first spectrum status information, whether the first spectrum in an area in which the auxiliary device is located is occupied, the method further includes:

obtaining, by the first base station, detection capability information of the auxiliary device, where the detection capability information includes a transmit frequency range and/or a detection type that are/is of the auxiliary device.

With reference to the first aspect and any of the first to the ninth possible implementation manners of the first aspect, in a tenth possible implementation manner, after the receiving, by the first base station, first spectrum status information sent by the auxiliary device, so that the first base station determines whether the first spectrum in an area in which the auxiliary device is located is occupied, the method further includes:

sending, by the first base station, information about whether the spectrum is occupied to a second base station, where the second base station is connected to the first base station.

According to a second aspect, an embodiment of the present invention provides a shared spectrum detection apparatus, including:

a sending module, configured to send spectrum detection information to an auxiliary device, where the spectrum detection information is used to instruct the auxiliary device to detect and/or report whether a first spectrum is occupied; and a receiving module, configured to receive first spectrum status information sent by the auxiliary device, so that the first base station determines whether the first spectrum in an area in which the auxiliary device is located is occupied.

In a first possible implementation manner, the processing module is specifically configured to: determine, according to the first spectrum status information, that the first spectrum is unoccupied; and then determine first transmit power on the first spectrum according to location information of the auxiliary device.

With reference to the first possible implementation manner of the second aspect, in a second possible implementation manner, the receiving module is specifically configured to receive the first spectrum status information that is sent by the auxiliary device by means of a scheduling request SR or a dedicated preamble.

With reference to an implementation manner of the second aspect, in a third possible implementation manner, the first spectrum status information is obtained by the auxiliary device after the auxiliary device detects according to a preset radio frame mode.

With reference to the third possible implementation manner of the second aspect, in a fourth possible implementation manner, the radio frame mode includes at least one radio frame, where the radio frame includes information about whether the first spectrum is available or information indicating that there is an opportunity to use the spectrum.

With reference to the second aspect and any of the first to the fourth possible implementation manners of the second aspect, in a fifth possible implementation manner, the sending module is further configured to: send detection configuration information to the auxiliary device by using a second spectrum, so that the auxiliary device detects the first spectrum; or send detection configuration information to the auxiliary device by using the first spectrum and second transmit power, so that the auxiliary device detects a status of the first spectrum, where the detection configuration information includes at least one or any combination of frequency information, RAT information, a detection type, a detection reporting period, or a detection result reporting trigger threshold; the second power is transmit power that is on the first spectrum and that is obtained by the first base station according to detection performed by the first base station; and the second transmit power is less than or equal to the first transmit power.

With reference to the second aspect and any of the first to the fifth possible implementation manners of the second aspect, in a sixth possible implementation manner, the sending module is further configured to send a signal by using the second transmit power, where the second transmit power is the transmit power that is on the first spectrum and that is obtained by the first base station according to detection performed by the first base station; the second transmit power is less than or equal to the first transmit power; and the signal includes at least one of a primary synchronization signal PSS, a secondary synchronization signal SSS, a cell-specific reference signal CRS, and a channel state information reference signal CSI-RS.

With reference to the first possible implementation manner of the second aspect, in a seventh possible implementation manner, the sending module is further configured to send a signal by using the first transmit power, where the signal includes a primary synchronization signal PSS, a secondary synchronization signal SSS, a cell-specific reference signal CRS, and a channel state information reference signal CSI-RS.

With reference to the second aspect and any of the first to the seventh possible implementation manners of the second aspect, in an eighth possible implementation manner, the auxiliary device is disposed within a coverage area or at a coverage edge of a cell to which the first base station corresponds on the first spectrum, or the auxiliary device is disposed within a coverage area of a cell to which the first base station corresponds on the second spectrum or disposed at a coverage edge of the first base station.

With reference to the eighth possible implementation manner of the second aspect, in a ninth possible implementation manner, the receiving module is further configured to obtain detection capability information of the auxiliary device, where the detection capability information includes a transmit frequency range and/or a detection type that are/is of the auxiliary device.

With reference to the second aspect and any of the first to the ninth possible implementation manners of the second aspect, in a sixteenth possible implementation manner, the sending module is further configured to send information about whether the spectrum is occupied to a second base station, where the second base station is connected to the first base station.

According to a third aspect, an embodiment of the present invention provides a base station, including: a transmitter, a receiver, a memory, and a processor that is separately connected to the transmitter, the receiver, and the memory; where:

the transmitter is configured to send spectrum detection information to an auxiliary device, where the spectrum detection information is used to instruct the auxiliary device to detect and/or report whether a first spectrum is occupied; and the receiver is configured to receive first spectrum status information sent by the auxiliary device, so that the first base station determines whether the first spectrum in an area in which the auxiliary device is located is occupied.

In a first possible implementation manner, the processor is specifically configured to: determine, according to the first spectrum status information, that the first spectrum is unoccupied; and then determine first transmit power on the first spectrum according to location information of the auxiliary device.

With reference to the first possible implementation manner of the third aspect, in a second possible implementation manner, the receiver is specifically configured to receive the first spectrum status information that is sent by the auxiliary device by means of a scheduling request SR or a dedicated preamble.

With reference to an implementation manner of the third aspect, in a third possible implementation manner, the first spectrum status information is obtained by the auxiliary device after the auxiliary device detects according to a preset radio frame mode.

With reference to the third possible implementation manner of the third aspect, in a fourth possible implementation manner, the radio frame mode includes at least one radio frame, where the radio frame includes information about whether the first spectrum is available or information indicating that there is an opportunity to use the spectrum.

With reference to the third aspect and any of the first to the fifth possible implementation manners of the third aspect, in a sixth possible implementation manner, the transmitter is further configured to: send detection configuration information to the auxiliary device by using a second spectrum, so that the auxiliary device detects the first spectrum; or send detection configuration information to the auxiliary device by using the first spectrum and second transmit power, so that the auxiliary device detects a status of the first spectrum, where the detection configuration information includes at least one or any combination of frequency information, RAT information, a detection type, a detection reporting period, or a detection result reporting trigger threshold; and the second power is transmit power that is on the first spectrum and that is obtained by the first base station according to detection performed by the first base station.

With reference to the third aspect and any of the first to the fifth possible implementation manners of the third aspect, in a sixth possible implementation manner, the transmitter is further configured to send a signal by using the second transmit power, where the second transmit power is the transmit power that is on the first spectrum and that is obtained by the first base station according to detection performed by the first base station; the second transmit power is less than or equal to the first transmit power; and the signal includes at least one of a primary synchronization signal PSS, a secondary synchronization signal SSS, a cell-specific reference signal CRS, and a channel state information reference signal CSI-RS.

With reference to the first possible implementation manner of the third aspect, in a seventh possible implementation manner, the transmitter is further configured to send a signal by using the first transmit power, where the signal includes a synchronization signal PSS, a secondary synchronization signal SSS, a cell-specific reference signal CRS, and a channel state information reference signal CSI-RS.

With reference to the third aspect and any of the first to the ninth possible implementation manners of the seventh aspect, in an eighth possible implementation manner, the auxiliary device is disposed within a coverage area or at a coverage edge of a cell to which the first base station corresponds on the first spectrum, or the auxiliary device is disposed within a coverage area of a cell to which the first base station corresponds on the second spectrum or disposed at a coverage edge of the first base station.

With reference to the eighth possible implementation manner of the third aspect, in a ninth possible implementation manner, the receiver is further configured to obtain detection capability information of the auxiliary device, where the detection capability information includes a transmit frequency range and/or a detection type that are/is of the auxiliary device.

With reference to the third aspect and any of the first to the ninth possible implementation manners of the third aspect, in a sixteenth possible implementation manner, the transmitter is further configured to send information about whether the spectrum is occupied to a second base station, where the second base station is connected to the first base station.

According to the spectrum detection method and apparatus and the base station that are provided in the embodiments of the present invention, a first base station sends spectrum detection information to an auxiliary device, where the spectrum detection information is used to instruct the auxiliary device to detect whether a first spectrum is occupied; then, the first base station receives first spectrum status information sent by the auxiliary device, so that the first base station determines whether the first spectrum in an area in which the auxiliary device is located is occupied. Therefore, it is implemented that the first base station may determine whether user equipment is interfered by another communications system device in a process in which the user equipment uses the first spectrum, so as to implement sharing of a spectrum by the user equipment with the another communications system device.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

A shared spectrum detection method provided in the embodiments of the present invention may be specifically applied to a case in which a communications system shares a spectrum with another communications system, where the communications system may be a Long Term Evolution (Long Term Evolution, LTE for short) system, a Code Division Multiple Access (Code Division Multiple Access, CDMA for short) 2000 system, a Universal Mobile Telecommunications System (Universal Mobile Telecommunications System, UMTS for short) system, a Global System for Mobile Communications (Global System of Mobile communication, GSM for short) system, or the like. The shared spectrum detection method provided in the embodiments may be specifically executed by a shared spectrum detection apparatus or a base station, where the shared spectrum detection apparatus may be integrated into the base station, and the shared spectrum detection apparatus may be implemented in a manner of software and/or hardware. The following uses an example in which the communications system is the LTE system, and the another communications system is a WiFi system to describe in detail the method and the apparatus that are provided in the embodiments.

Figure 1:
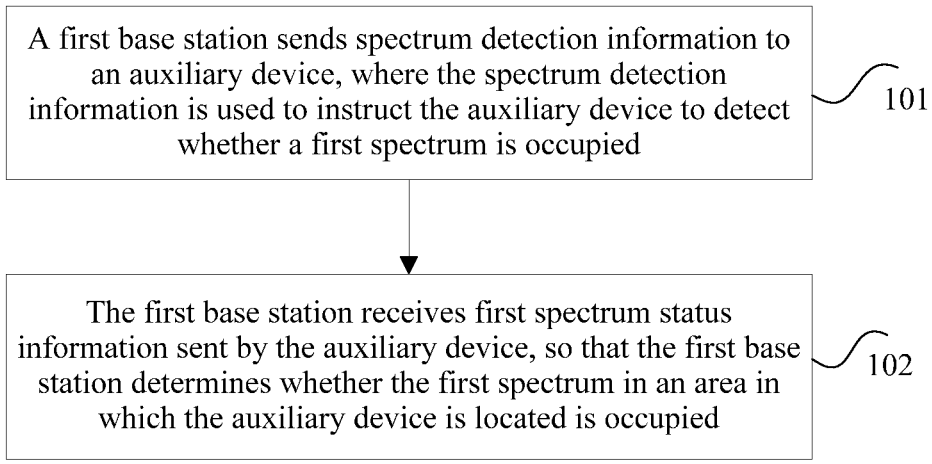
FIG. 1 is a schematic flowchart of a spectrum detection method according to an embodiment of the present invention.
Figure 2:
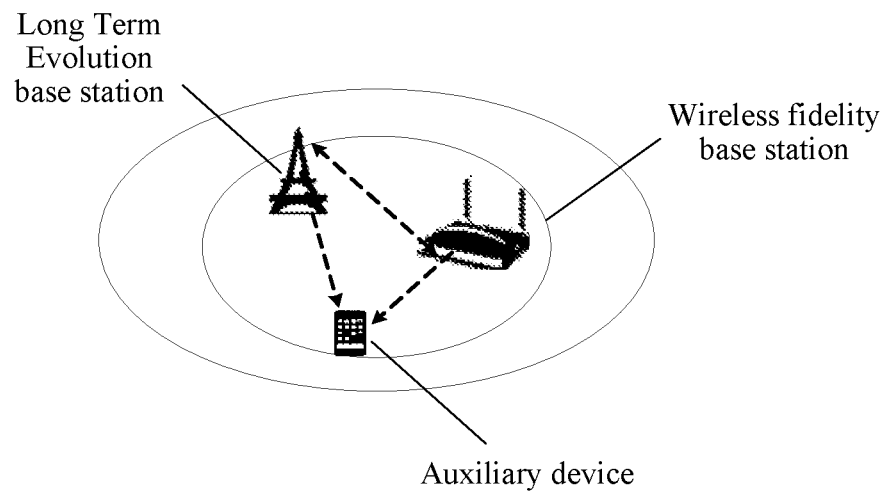
FIG. 2 is a schematic diagram of an applicable scenario of an embodiment of the present invention.
Figure 3:
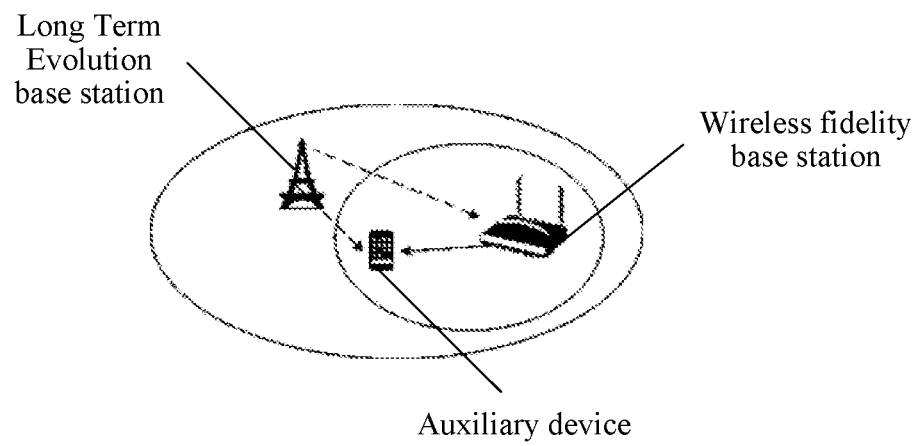
FIG. 3 is a schematic diagram of an applicable scenario of another embodiment of the present invention.
Figure 4:
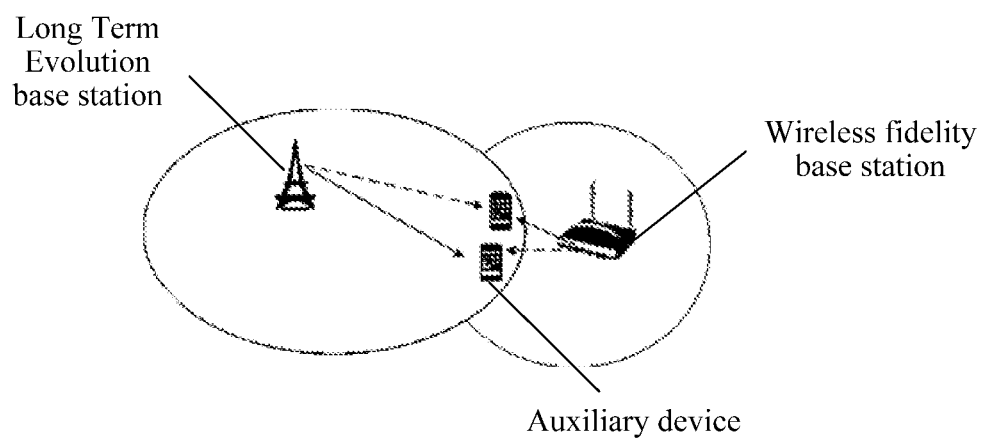
FIG. 4 is a schematic diagram of an applicable scenario of still another embodiment of the present invention.

FIG. 1 is a schematic flowchart of a spectrum detection method according to an embodiment of the present invention. FIG. 2 is a schematic diagram of an applicable scenario of an embodiment of the present invention. FIG. 3 is a schematic diagram of an applicable scenario of another embodiment of the present invention. FIG. 4 is a schematic diagram of an applicable scenario of still another embodiment of the present invention. As shown in FIG. 1, the spectrum detection method provided in this embodiment specifically includes the following steps:

Step 101. A first base station sends spectrum detection information to an auxiliary device, where the spectrum detection information is used to instruct the auxiliary device to detect whether a first spectrum is occupied.

In this embodiment, when the first base station prepares to occupy the first spectrum to send data or a signal, a specific implementation manner may be: The first base station first determines whether the first spectrum is idle; if the first spectrum is occupied, that is, the first base station determines that the first spectrum is occupied within a coverage area of the first base station, the first base station does not occupy the first spectrum within duration; if the first spectrum is idle, the first base station determines, according to first spectrum status information, whether the first spectrum in an area in which the auxiliary device is located is occupied, that is, if the first base station determines that the first spectrum is idle within the coverage area of the first base station, the first base station may further determine, according to information indicating that the auxiliary device detects whether the first spectrum is occupied, whether the first spectrum in the area in which the auxiliary device is located is occupied.

It should be noted that, after receiving the spectrum detection information, the auxiliary device may perform spectrum detection (spectrum detection), or spectrum sensing (spectrum sensing), or detection (measurement), and report a detection result; or after receiving the spectrum detection information, the auxiliary device directly reports a detection result, and the detection result may be a result obtained by means of detection according to preconfigured measurement configuration information. The measurement configuration information may be preconfigured on the auxiliary device, or the measurement configuration information may be sent by the first base station to the auxiliary device. In the present invention, detection, sensing, and measurement are interchangeable.

In this embodiment, the spectrum detection information is carried in broadcast signaling or dedicated signaling. For example, the spectrum detection information may be carried in dedicated signaling based on a single user, or group scheduling signaling or broadcast signaling based on multiple users, or interface signaling based on an interface between the first base station and the auxiliary device, where the dedicated signaling, the group scheduling signaling, the broadcast signaling, and the interface signaling are indicated by a physical downlink control channel (Physical Downlink Control Channel, PDCCH for short) or an enhanced physical downlink control channel (Enhanced PDCCH, EPDCCH for short). In the case of dedicated signaling, the spectrum detection information may also be carried in a Medium Access Control control element (Medium Access Control Control Element, MAC CE for short). The spectrum detection information may include at least one or any combination of frequency information, radio access technology (Radio Access Technology, RAT for short) information, a detection type, a detection result reporting period, or a detection result reporting trigger threshold, where the frequency information may be a frequency range, or a channel number or physical cell identity (Physical Cell Identity, PCI for short) corresponding to the first spectrum.

In this embodiment, the auxiliary device may be disposed within a coverage area or at a coverage edge of a cell to which the first base station corresponds on the first spectrum, or the auxiliary device may be disposed within a coverage area or at a coverage edge of a cell to which the first base station corresponds on a second spectrum. For example, disposing of the auxiliary device may be based on the second spectrum, such as a coverage area of a cell on a licensed spectrum, or may be based on the first spectrum, such as a coverage area of a cell on an unlicensed spectrum. Disposing of the auxiliary device includes at least the following three applicable scenarios:

A first applicable scenario: As shown in FIG. 2, a WiFi base station or an access point (Access Point, AP for short) is located within a downlink coverage area of an LTE base station, and the LTE base station is also located within a downlink coverage area of the WiFi base station; in addition, the auxiliary device is disposed within a common coverage area of the WiFi base station and the LTE base station. When the LTE base station and the WiFi base station simultaneously send data or a signal on a same spectrum, the auxiliary device simultaneously receives the data or the signal sent by the LTE base station and the WiFi base station, thereby generating co-channel interference.

A second applicable scenario: As shown in FIG. 3, a WiFi base station is located within a downlink coverage area of an LTE base station, and the LTE base station is also located within a downlink coverage area of the WiFi base station; in addition, the auxiliary device is disposed within the downlink coverage area of the WiFi base station. When the LTE base station and the WiFi base station simultaneously send data or a signal on a same spectrum, the auxiliary device simultaneously receives the data or the signal sent by the LTE base station and the Wi-Fi base station, thereby generating co-channel interference.

A third applicable scenario: As shown in FIG. 4, a WiFi base station is located outside a downlink coverage area of an LTE base station, and the LTE base station is also located outside a downlink coverage area of the WiFi base station. In addition, the downlink coverage area of the WiFi base station and the downlink coverage area of the LTE base station have an overlapping area. The auxiliary device is disposed within the overlapping area. When the LTE base station and the WiFi base station simultaneously send data or a signal on a same spectrum, the auxiliary device simultaneously receives the data or the signal sent by the LTE base station and the WiFi base station, thereby generating co-channel interference.

In the foregoing three applicable scenarios, the downlink coverage area may be the coverage area of the cell to which the first base station corresponds on the first spectrum, or the coverage area of the cell to which the first base station corresponds on the second spectrum, which is not limited herein.

It should be noted that, in the first applicable scenario, when the WiFi base station sends data or a signal on the first spectrum that the first base station prepares to occupy, the first base station, that is, the LTE base station, may detect that the first spectrum is occupied. However, for the second applicable scenario and the third applicable scenario, when the WiFi base station sends data or a signal on the first spectrum, the first base station, that is, the LTE base station, cannot detect that the first spectrum is occupied; therefore, after determining that the first spectrum that the first base station prepares to occupy is idle, the first base station needs to determine, according to the first spectrum status information, that is, the information indicating that the auxiliary device detects whether the first spectrum is occupied, whether the first spectrum is occupied. The auxiliary device is user equipment (User Equipment, UE for short) or an auxiliary detection unit, where the auxiliary detection unit may be a radio sending/receiving device, such as a remote radio head (Remote Radio Head, RRH for short), or a sensor (sensor), or a machine type communication (Machine Type Communication, MTC for short) device, or an LTE small-cell base station (small eNB), or a radio relay (relay), or another similar radio sending/receiving dot (radio dot) device.

It should be noted that, the first spectrum status information is obtained by the first base station by using a fiber or a wireless interface that is disposed between the auxiliary device and the base station, where the wireless interface may use a wireless technology, such as an LTE technology, a microwave technology, and a WiFi technology.

Optionally, the auxiliary device communicates with the first base station in any manner of a radio frequency (Radio Frequency, RF for short), a baseband (baseband), a Un interface, or an X2 interface.

It should be noted that, communication between the auxiliary device and the first base station is ideal, that is, a delay may be ignored. For example, the delay is almost zero. In a case in which communication between the auxiliary detection unit and the base station is not ideal, that is, a particular delay exists, communication may be performed by using a cognitive pilot channel (Cognitive Pilot Channel, CPC for short) or in a manner in which UE performs forwarding by using an air interface, so as to reduce the delay.

Step 102. The first base station receives first spectrum status information sent by the auxiliary device, so that the first base station determines whether the first spectrum in an area in which the auxiliary device is located is occupied.

The first spectrum status information is a message indicating that the auxiliary device detects whether the first spectrum is occupied.

For example, the first base station may receive the first spectrum status information that is sent by the auxiliary device by means of a scheduling request SR or a dedicated preamble.

In this embodiment, there include at least two following implementation manners of determining, by the first base station according to the first spectrum status information, whether the first spectrum in the area in which the auxiliary device is located is occupied:

In a first implementation manner, the first base station determines, according to the first spectrum status information, that the first spectrum is unoccupied; then, the first base station determines first transmit power on the first spectrum according to location information of the auxiliary device, where the first transmit power may be maximum transmit power, maximum allowed transmit power, nominal power, or the like of the first base station.

In a second implementation manner, if the first base station determines, according to the first spectrum status information, that the first spectrum is occupied, the first base station performs transmission by using second transmit power, for example, the first base station may perform transmission by continuously using power of sending the spectrum detection information to the auxiliary device.

In this embodiment, the first base station determines the first transmit power on the first spectrum according to the location information of the auxiliary device, that is, after adjusting power of sending data or a signal on the spectrum, the first base station notifies UE of the first transmit power, where the UE is located within a downlink coverage area of the first base station at the first transmit power.

On the basis of the foregoing embodiment, the first base station receives the first spectrum status information obtained by the auxiliary device, where the first spectrum status information is obtained by the auxiliary device after the auxiliary device detects according to a preset radio frame mode. The radio frame mode includes at least one radio frame, where the radio frame includes information about whether the spectrum is available or information indicating that there is an opportunity to use the spectrum. The former means that the base station may directly send, on some subframes according to the radio frame mode, data and/or a signal on the spectrum by using an LTE technology, and such an operation may be based on negotiation performed by the base station with a different system in advance, or the base station does not consider whether the different system is using the spectrum. The latter means that the base station has an opportunity to send data and/or a signal by using LTE; however, whether the data and/or the signal is sent by using LTE may be determined based on a detection result of the base station, and the auxiliary device still needs to perform detection to determine whether there really are/is LTE data and/or a signal.

Optionally, after the first base station determines the first transmit power on the spectrum according to the location information of the auxiliary device, the method may further include:

sending, by the first base station, a signal by using the first transmit power, where the signal includes a synchronization signal (Primary Synchronization Signal, PSS for short), a secondary synchronization signal (Secondary Synchronization Signal, SSS for short), a cell-specific reference signal (Cell Reference Signal, CRS for short), a channel state information reference signal (Channel Status Indication Reference Signal, CSI-RS for short), a demodulation reference signal DMRS, and the like.

In this embodiment, a first base station sends spectrum detection information to an auxiliary device, where the spectrum detection information is used to instruct the auxiliary device to detect whether a first spectrum is occupied; then, the first base station receives first spectrum status information sent by the auxiliary device, so that the first base station determines whether the first spectrum in an area in which the auxiliary device is located is occupied. Therefore, it is implemented that the first base station may determine whether user equipment is interfered by another communications system device in a process in which the user equipment uses the first spectrum, so as to implement sharing of a spectrum by the user equipment with the another communications system device.

On the basis of the foregoing embodiment, before the first base station determines, according to the first spectrum status information, whether the first spectrum in the area in which the auxiliary device is located is occupied, the method may further include:

obtaining, by the first base station, the location information of the auxiliary device.

In this embodiment, an implementation manner of obtaining, by the first base station, the location information of the auxiliary device may specifically include any of multiple technical means, such as a positioning technology, a geo-location database (Geo-location database), an operation, administration and maintenance system (Operations, Administration and Maintenance, OAM for short). It should be noted that, after a location of the auxiliary device changes, the first base station needs to be notified in a timely manner. In addition, the location information of the auxiliary device may also be sent to the base station along with the first spectrum status information; for example, the location information of the auxiliary device may be accurate location information similar to a global positioning system (Global Positioning Satellite System, GPS for short), or rough location information such as a timing advance value (Timing Advance, TA for short).

Further, on the basis of the foregoing embodiment, before the determining, according to the first spectrum status information, whether the spectrum is occupied, the method may further include:

obtaining, by the first base station, detection capability information of the auxiliary device, where the detection capability information includes a transmit frequency range and/or a detection type that are/is of the auxiliary device.

On the basis of the foregoing embodiment, before the determining, according to the first spectrum status information, whether the first spectrum in the area in which the auxiliary device is located is occupied, the method may further include:

sending, by the first base station, detection configuration information to the auxiliary device by using the first spectrum and second transmit power, so that the auxiliary device detects a status of the first spectrum; or sending, by the first base station, detection configuration information to the auxiliary device by using the second spectrum, so that the auxiliary device detects the first spectrum.

In this embodiment, the second power is transmit power that is on the first spectrum and that is obtained by the first base station according to detection performed by the first base station. The detection configuration information may include at least one or any combination of frequency information, radio access technology RAT information, a detection type, a detection reporting period, or a threshold for triggering detection reporting that are of the first spectrum, where the frequency information may be a frequency range, or a channel number or physical cell identity (Physical Cell Identity, PCI for short) corresponding to the spectrum.

It should be noted that, the detection configuration information may be preconfigured on the auxiliary device, or the detection configuration information may be sent to the auxiliary device by using the first base station.

In this embodiment, it is implemented that the auxiliary device detects the status of the first spectrum, and when the first base station needs to determine, according to the first spectrum status information, whether the spectrum is occupied, the first base station can quickly obtain the first spectrum status information.

It should be noted that, the detection configuration information is carried in broadcast signaling or dedicated signaling.

Specifically, the measurement configuration information is carried in the following instructions: dedicated signaling based on a single user, group scheduling signaling or broadcast signaling based on multiple users, or interface signaling based on an interface between the first base station and the auxiliary device, where the dedicated signaling, the group scheduling signaling, the broadcast signaling, and the interface signaling are indicated by a PDCCH or an EPDCCH.

Optionally, on the basis of the foregoing embodiment, before the determining, according to the first spectrum status information, whether the spectrum is occupied, the method may further include:

sending, by the first base station, a signal by using the second power, where the second power is less than or equal to the first power, and the signal includes at least one of a PSS, an SSS, a CRS, a CSI-RS, and a DMRS. Further, the signal may further include a message that notifies UE of enabling of the LTE, scheduling signaling, and the like. Furthermore, the first base station sends downlink signal transmit power to the auxiliary device, where the transmit power is used for the auxiliary device to measure reference signal received power (Reference Signal Received Power, RSRP for short), reference signal received quality (Reference Signal Received Quality, RSRQ for short), channel state information (Channel Statusinformation, CSI for short), and the like; CSI measurement includes a channel quality indication (Channel Quality Indication, CQI for short), a precoding matrix indicator (Precoding Matrix Indicator, PMI for short), a rank indication (Rank Indication), and the like.

On the basis of the foregoing embodiment, after the first base station determines the first transmit power on the spectrum according to the location information of the auxiliary device, the method further includes:

sending, by the first base station, information about whether the spectrum is occupied to a second base station, where the second base station is connected to the first base station; for example, there is an X2 interface between the first base station and the second base station.

Figure 5:
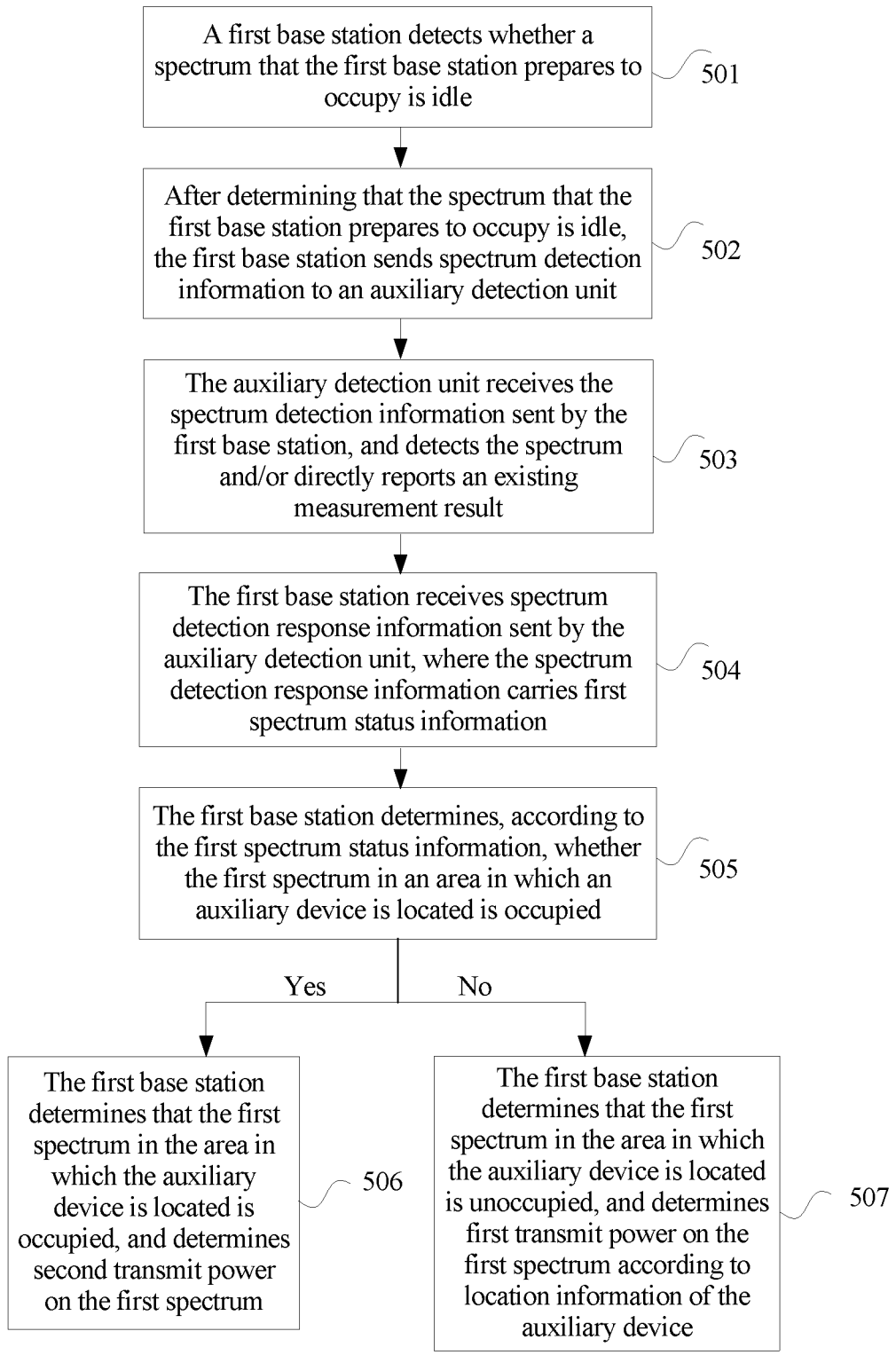
FIG. 5 is a schematic flowchart of a spectrum detection method according to another embodiment of the present invention.

FIG. 5 is a schematic flowchart of a spectrum detection method according to another embodiment of the present invention. As shown in FIG. 5, an auxiliary device in this embodiment is an auxiliary detection unit, that is, any of an RRH, or a sensor (sensor), or a machine type communication (Machine Type Communication, MTC for short) device, or an LTE small-cell base station (small eNB), or a radio relay, or another similar radio sending/receiving dot (radio dot) device. In this embodiment, a spectrum that a first base station prepares to occupy is a first spectrum, and the method may include the following steps:

Step 501. The first base station detects whether the spectrum that the first base station prepares to occupy is idle.

Specifically, an implementation manner of detecting, by the first base station, whether the spectrum that the first base station prepares to occupy is idle includes any of the following types: physical layer energy detection (energy sensing or energy detection), covariance matrix detection (covariance matrix detection), matched filter detection (Matched Filter Detection), cyclostationary feature detection (Cyclostationary Feature Detection), a received signal strength indicator (Received Signal Strength Indication, RSSI for short), interference measurement (Interference Measurement), a signal-to-noise ratio (Signal To Noise Rate, SNR for short), a signal to interference plus noise ratio (Signal To Interference Noise Rate, SINR for short), RSRP, RSRQ, rise over thermal (Rise Over Thermal, ROT for short), a channel quality indication (CQI, channel quality indication), and the like. Generally, physical layer detection may be completed within a time of tens of microseconds, such as 20 microseconds, which may be much shorter than a time of 71.43 microseconds of one orthogonal frequency division multiplexing (orthogonal frequency division multiplexing, OFDM for short) symbol (symbol) of an LTE system. Covariance matrix detection requires a longer time, but can achieve higher detection precision.

Step 502. After determining that the spectrum that the first base station prepares to occupy is idle, the first base station sends spectrum detection information to the auxiliary detection unit.

In this embodiment, the spectrum detection information is used to instruct the auxiliary detection unit to detect whether the spectrum is occupied. The spectrum detection information is carried in broadcast signaling or dedicated signaling.

For example, the spectrum detection information may be carried in dedicated signaling based on a single user, or group scheduling signaling or broadcast signaling based on multiple users, or interface signaling based on an interface between the first base station and the auxiliary detection unit, where the dedicated signaling, the group scheduling signaling, the broadcast signaling, and the interface signaling are indicated by a PDCCH or an EPDCCH.

Optionally, the first base station adds, to the spectrum detection information, frequency information, a detection threshold and/or information about an expected time length for occupying a spectrum, where the frequency information may be one or more frequency ranges, or a channel number, or a physical cell identity. The foregoing information may also be preconfigured for the auxiliary detection unit; in this case, the foregoing information does not need to be carried in control information. Optionally, the first base station may send a CTS frame to reserve a particular time for the spectrum. Optionally, the first base station may also first perform, according to downlink transmit power determined by a detection capability range of the first base station, at least one or more of the following behaviors: sending an LTE primary synchronization signal and SSS, a CRS, and a CSI-RS; sending a message that notifies UE of enabling of LTE; and sending scheduling signaling to the UE. Further, the first base station sends information about downlink signal transmit power to the auxiliary detection unit, where the information about the transmit power is used for the auxiliary detection unit to measure RSRP, RSRQ, a CSI, and the like.

Step 503. The auxiliary detection unit receives the spectrum detection information sent by the first base station, and detects the spectrum and/or directly reports an existing measurement result.

In this embodiment, a manner of performing detection on the spectrum by the auxiliary detection unit includes at least: detecting a status of an unlicensed spectrum by means of physical layer energy detection, covariance matrix detection, or the like; and immediately reporting, to the base station, one or more frequency ranges or a channel number and spectrum statuses corresponding to the frequency ranges. For example, the first base station may be notified by using physical layer signaling.

Optionally, the first base station may preconfigure a detection threshold for the auxiliary detection unit; the auxiliary detection unit sends spectrum detection response information to the first base station only when the measurement result is greater than or less than the threshold. If the auxiliary detection unit acquires a detection result, when receiving the spectrum detection information of the first base station, the auxiliary detection unit immediately reports a corresponding spectrum status to the base station. Optionally, the auxiliary detection unit sends, according to the information about an expected time length for occupying a spectrum, a spectrum occupied by a physical layer signal or a CTS frame at a MAC layer, where time lengths corresponding to different spectrums may be the same or different.

Step 504. The first base station receives spectrum detection response information sent by the auxiliary detection unit, where the spectrum detection response information carries first spectrum status information.

Specifically, the first base station determines first transmit power on the spectrum according to location information of the auxiliary detection unit. Further, after determining the first transmit power on the spectrum, the first base station performs at least one of the following behaviors: sending an LTE primary synchronization signal PSS and secondary synchronization signal SSS to UE by using the first transmit power; sending a cell-specific reference signal CRS and/or a channel state information reference signal CSI-RS and/or a demodulation reference signal DMRS; sending, by the base station to UE, a message that notifies UE of enabling of LTE; and sending scheduling signaling to the UE.

Step 505. The first base station determines, according to the first spectrum status information, whether the first spectrum in an area in which the auxiliary device is located is occupied.

Specifically, if the first base station determines that the first spectrum in the area in which the auxiliary device is located is occupied, step 506 is executed. If the first base station determines that the first spectrum in the area in which the auxiliary device is located is occupied, step 507 is executed.

Step 506. The first base station determines that the first spectrum in the area in which the auxiliary device is located is occupied, and determines second transmit power on the first spectrum.

The second transmit power in this embodiment may be power of sending the spectrum detection information to an auxiliary base station.

Step 507. The first base station determines that the first spectrum in the area in which the auxiliary device is located is unoccupied, and determines first transmit power on the first spectrum according to location information of the auxiliary device.

For example, the first transmit power may be maximum transmit power, or nominal power, or maximum allowed transmit power of the first base station.

Figure 6:
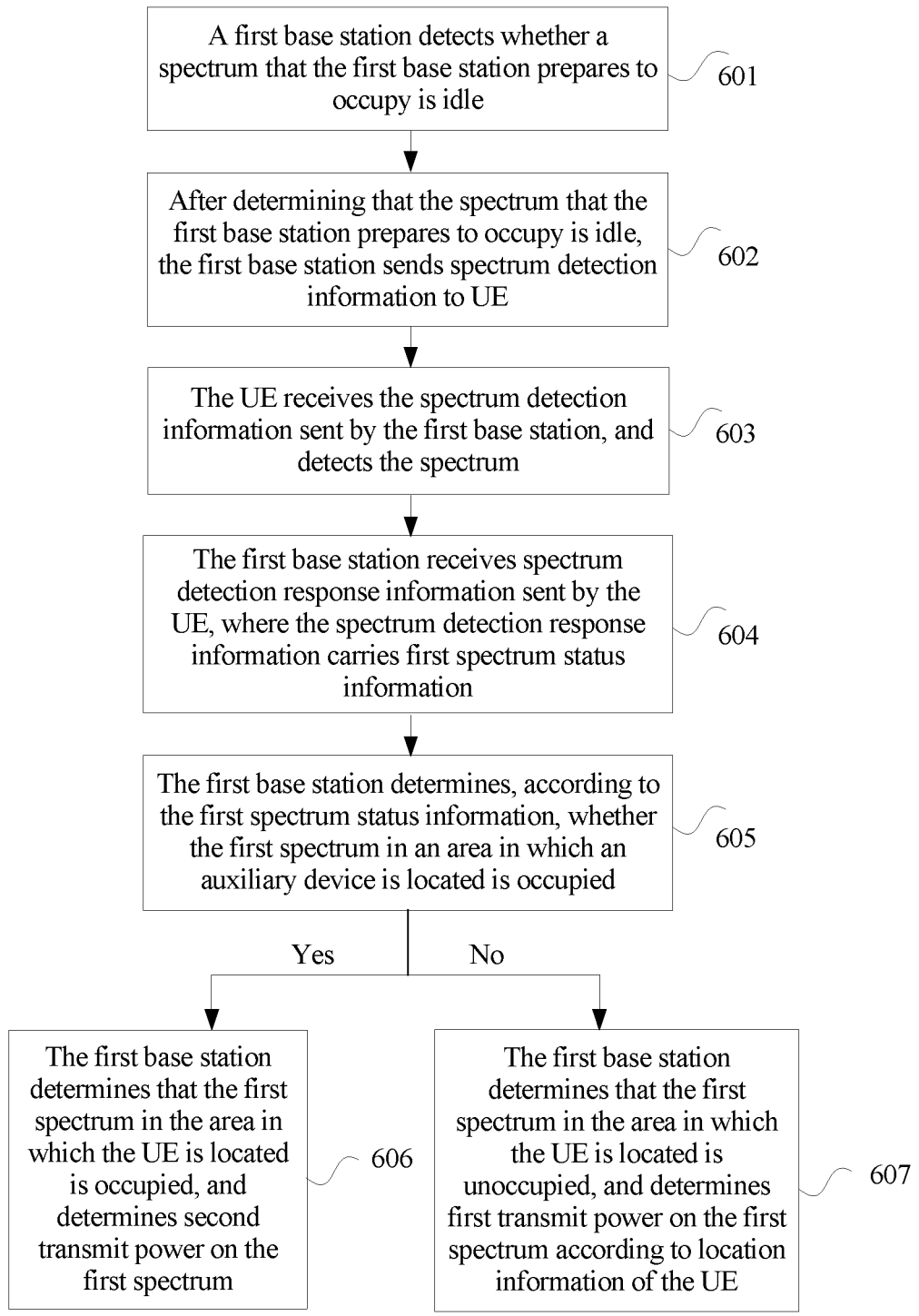
FIG. 6 is a schematic flowchart of a spectrum detection method according to still another embodiment of the present invention.

FIG. 6 is a schematic flowchart of a spectrum detection method according to still another embodiment of the present invention. As shown in FIG. 6, an auxiliary device in this embodiment is UE, and the method may include the following steps:

Step 601. A first base station detects whether a spectrum that the first base station prepares to occupy is idle.

An implementation manner of step 601 in this embodiment is similar to an implementation manner of step 501, and details are not described herein again.

Step 602. After determining that the spectrum that the first base station prepares to occupy is idle, the first base station sends spectrum detection information to the UE.

Specifically, the first base station may select, according to location information or fingerprint (finger print) information that are of the UE, appropriate UE to perform detection, for example, UE located within the downlink coverage area of the Wi-Fi base station in the second applicable scenario, or UE located within the overlapping area of the downlink coverage area of the Wi-Fi base station and the downlink coverage area of the LTE base station in the third applicable scenario.

The spectrum detection information is used to instruct the auxiliary device to detect whether the spectrum is occupied. The spectrum detection information is carried in broadcast signaling or dedicated signaling. For example, the spectrum detection information may be carried in dedicated signaling based on a single user, or group scheduling signaling or broadcast signaling based on multiple users, or interface signaling based on an interface between the first base station and the auxiliary device, where the dedicated signaling, the group scheduling signaling, the broadcast signaling, and the interface signaling are indicated by a PDCCH or an EPDCCH.

Optionally, the first base station adds, to the spectrum detection information, frequency information, a detection threshold and/or information about an expected time length for occupying a spectrum, where the frequency information may be a frequency range, or a channel number, or a physical cell identity. The foregoing information may also be preconfigured for an auxiliary detection unit; in this case, the foregoing information does not need to be carried in control information. Optionally, the first base station may send a CTS frame to reserve a particular time for the spectrum. Optionally, the first base station may also first perform, according to downlink transmit power determined by a detection capability range of the first base station, at least one or more of the following behaviors: sending an LTE primary synchronization signal PSS and SSS, a CRS, CSI-RS, and a DMRS; sending a message that notifies UE of enabling of LTE; and sending scheduling signal. Further, the first base station sends downlink signal transmit power to the UE, where the transmit power is used for the auxiliary device to measure RSRP, RSRQ, a CSI, and the like.

Step 603. The UE receives the spectrum detection information sent by the first base station, and detects the spectrum.

In this embodiment, a manner of performing detection on the spectrum by the auxiliary device includes at least: detecting a status of an unlicensed spectrum by means of physical layer energy detection, covariance matrix detection, or the like; and immediately reporting, to the base station, one or more frequency ranges or a channel number and spectrum statuses corresponding to the frequency ranges. For example, the first base station may be notified by using physical layer signaling.

Step 604. The first base station receives spectrum detection response information sent by the UE, where the spectrum detection response information carries first spectrum status information.

For example, the UE may notify the base station by using physical layer signaling, for example, the UE may send signaling of a special format, such as a scheduling request (scheduling request, SR for short), on a PCell or a cell on another spectrum by using a physical uplink control channel (Physical Uplink Control Channel, PUCCH for short). The base station may allocate, to the UE in control information that instructs the UE to perform spectrum detection, a time-frequency domain resource of an SR that is used to feed back a spectrum detection status, or preconfigure, for the UE by using radio resource control signaling, the time-frequency domain resource of the SR that is used to feed back the spectrum detection status. The UE may further send a dedicated (dedicated) preamble (preamble) by using a physical random access channel (Physical Random Access Channel, PRACH for short) configured on an unlicensed spectrum, to notify the base station of a spectrum status. In a case in which the unlicensed spectrum is used only for a downlink service, the random access channel may be used only for the UE to feed back spectrum status information; the dedicated preamble may be carried in the control information that instructs the UE to perform spectrum detection, or may be preconfigured for the UE. The UE may further use a Medium Access Control control element (Medium Access Control Control Element, MAC CE for short) to notify the base station of the spectrum status, and the base station may allocate, in the control information that instructs the UE to perform spectrum detection, a time-frequency domain resource used for the UE to send the MAC CE. Optionally, information fed back by the UE may further include information such as frequency range information, a channel number, location information, and an uplink timing advance value (Timing Advance Value, TA for short), which is used for the base station to determine a location, a distance, and the like of the UE. Optionally, the base station may preconfigure information for the UE, such as a detection threshold and a detection result reporting condition; the UE sends feedback information to the base station only when a measurement result is greater than or less than the threshold.

Step 605. The first base station determines, according to the first spectrum status information, whether the first spectrum in an area in which the auxiliary device is located is occupied.

Specifically, if yes, step 606 is executed; and if no, step 607 is executed.

Step 606. The first base station determines that the first spectrum in the area in which the UE is located is occupied, and determines second transmit power on the first spectrum.

Step 607. The first base station determines that the first spectrum in the area in which the UE is located is unoccupied, and determines first transmit power on the first spectrum according to location information of the UE.

Figure 7:
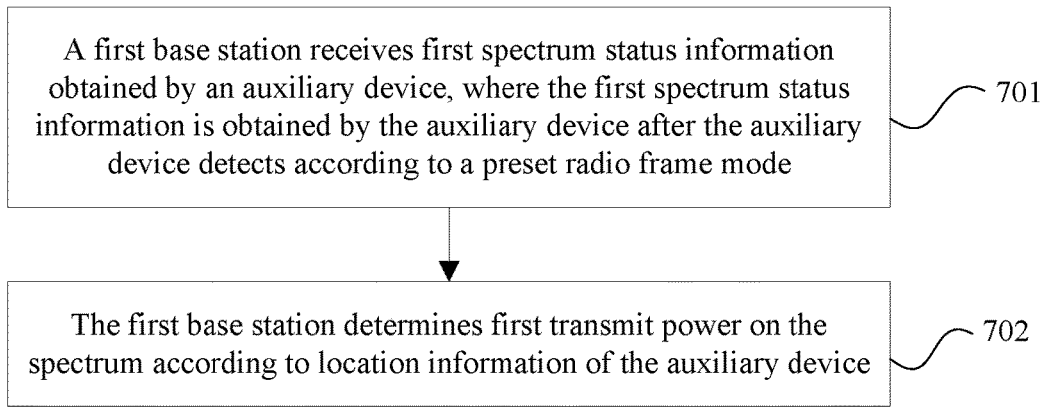
FIG. 7 is a schematic flowchart of a spectrum detection method according to still another embodiment of the present invention.

FIG. 7 is a schematic flowchart of a spectrum detection method according to still another embodiment of the present invention. As shown in FIG. 7, an auxiliary device in this embodiment is UE or an auxiliary detection unit, and the method may include the following steps:

Step 701. A first base station receives first spectrum status information obtained by an auxiliary device, where the first spectrum status information is obtained by the auxiliary device after the auxiliary device detects according to a preset radio frame mode.

In this embodiment, the radio frame mode includes at least one radio frame, where the radio frame includes information about whether the spectrum is available or information indicating that there is an opportunity to use the spectrum. The former means that the base station may directly send, on some subframes according to the radio frame mode, data and/or a signal on the spectrum by using an LTE technology, and such an operation may be based on negotiation performed by the base station with a different system in advance, or the base station does not consider whether the different system is using the spectrum. The latter means that the base station has an opportunity to send data and/or a signal by using LTE; however, whether the data and/or the signal is sent by using LTE may be determined based on a detection result of the base station, and the auxiliary device still needs to perform detection to determine whether there really are/is LTE data and/or a signal.

For example, the radio frame mode may be in a bitmap (bitmap) manner, and the bitmap may be set in a unit of one or more radio frames. One radio frame includes ten subframes, and one subframe is one millisecond; for example, a subframe mode in a unit of one radio frame may be 1111111100. The first base station and the auxiliary device perform, according to the foregoing subframe mode, spectrum detection from a first subframe in subframes represented by values "1". Once it is detected that the spectrum is idle, a maximum of all the subframes represented by the values "1" are occupied; if it is detected that the spectrum is busy, the first base station and the auxiliary device wait for a subframe that is represented by a first value "1" and is after a subframe represented by a value "0", and then restart to perform spectrum detection. A detected frequency range or channel number may be preconfigured or dynamically or semi-statically negotiated between the base station and an auxiliary detection unit. Alternatively, the first base station directly sends, from a first subframe in subframes represented by values "1", LTE data and/or a signal according to the foregoing subframe mode, and the auxiliary detection unit directly measures, from the first subframe in the subframes represented by the values "1", information such as RSRP, RSRQ, and a CSI of an LTE signal.

It should be noted that, before the first base station receives the first spectrum status information obtained by the auxiliary device, the auxiliary device may detect, in any of manners in step 501, whether the spectrum is idle.

Optionally, the auxiliary device may send the first spectrum status information to the first base station each time the auxiliary device detects that the spectrum is idle, or send the first spectrum status information to the first base station after each detection. The first spectrum status information includes a frequency range or a channel number corresponding to the spectrum, or a frequency range or a channel number that is agreed on in advance. Optionally, the first base station may preconfigure information such as a measurement threshold and a reporting condition for the auxiliary device; the auxiliary device sends the first spectrum status information to the base station only when a measurement result is greater than or less than the threshold.

Step 702. The first base station determines first transmit power on the spectrum according to location information of the auxiliary device.

Figure 8:
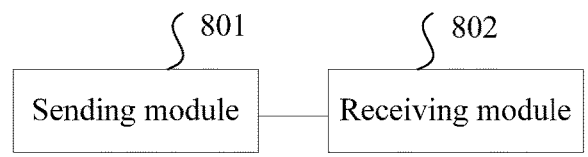
FIG. 8 is a schematic structural diagram of a spectrum detection apparatus according to an embodiment of the present invention.

FIG. 8 is a schematic structural diagram of a spectrum detection apparatus according to an embodiment of the present invention. As shown in FIG. 8, the shared spectrum detection apparatus includes a sending module 801 and a receiving module 802. The sending module 801 is configured to send spectrum detection information to an auxiliary device, where the spectrum detection information is used to instruct the auxiliary device to detect whether a first spectrum is occupied. The receiving module 802 is configured to receive first spectrum status information sent by the auxiliary device, so that the first base station determines whether the first spectrum in an area in which the auxiliary device is located is occupied.

In this embodiment, a first base station sends spectrum detection information to an auxiliary device, where the spectrum detection information is used to instruct the auxiliary device to detect whether a first spectrum is occupied; then, the first base station receives first spectrum status information sent by the auxiliary device, so that the first base station determines whether the first spectrum in an area in which the auxiliary device is located is occupied. Therefore, it is implemented that the first base station may determine whether user equipment is interfered by another communications system device in a process in which the user equipment uses the first spectrum, so as to implement sharing of a spectrum by the user equipment with the another communications system device.

Figure 9:
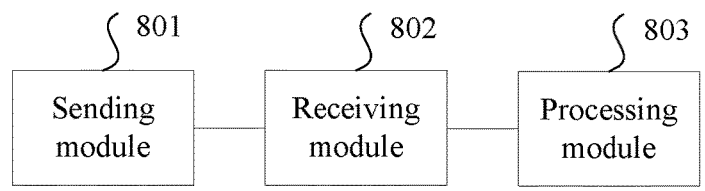
FIG. 9 is a schematic structural diagram of a spectrum detection apparatus according to another embodiment of the present invention.

FIG. 9 is a schematic structural diagram of a spectrum detection apparatus according to another embodiment of the present invention. As shown in FIG. 9, on the basis of the foregoing embodiment, the shared spectrum detection apparatus further includes a processing module 803, where the processing module 803 is specifically configured to: determine, according to the first spectrum status information, that the first spectrum is unoccupied; and then determine first transmit power on the first spectrum according to location information of the auxiliary device.

Further, on the basis of the foregoing embodiment, the receiving module 802 is specifically configured to receive the first spectrum status information that is sent by the auxiliary device by means of a scheduling request SR or a dedicated preamble.

On the basis of the foregoing embodiment, the spectrum detection information is carried in broadcast signaling or dedicated signaling.

On the basis of the foregoing embodiment, the first spectrum status information is obtained by the auxiliary device after the auxiliary device detects according to a preset radio frame mode.

Further, on the basis of the foregoing embodiment, the radio frame mode includes at least one radio frame, where the radio frame includes information about whether the first spectrum is available or information indicating that there is an opportunity to use the spectrum.

Further, on the basis of the foregoing embodiment, the sending module 801 is further configured to: send detection configuration information to the auxiliary device by using a second spectrum, so that the auxiliary device detects the first spectrum; or send detection configuration information to the auxiliary device by using the first spectrum and second transmit power, so that the auxiliary device detects a status of the first spectrum, where the detection configuration information includes at least one or any combination of frequency information, RAT information, a detection type, a detection reporting period, or a detection result reporting trigger threshold; the second power is transmit power that is on the first spectrum and that is obtained by the first base station according to detection performed by the first base station; and the second transmit power is less than or equal to the first transmit power.

On the basis of the foregoing embodiment, the detection configuration information is carried in broadcast signaling or dedicated signaling.

Further, on the basis of the foregoing embodiment, the sending module 801 is further configured to send a signal by using the second transmit power, where the second transmit power is the transmit power that is on the first spectrum and that is obtained by the first base station according to detection performed by the first base station; the second transmit power is less than or equal to the first transmit power; and the signal includes at least one of a primary synchronization signal PSS, a secondary synchronization signal SSS, a cell-specific reference signal CRS, and a channel state information reference signal CSI-RS.

On the basis of the foregoing embodiment, the sending module 801 is further configured to send a signal by using the first transmit power, where the signal includes a synchronization signal PSS, a secondary synchronization signal SSS, a cell-specific reference signal CRS, and a channel state information reference signal CSI-RS.

Further, on the basis of the foregoing embodiment, the auxiliary device is disposed within a coverage area or at a coverage edge of a cell to which the first base station corresponds on the first spectrum, or the auxiliary device is disposed within a coverage area of a cell to which the first base station corresponds on the second spectrum or disposed at a coverage edge of the first base station.

On the basis of the foregoing embodiment, the first spectrum status information is obtained by the first base station by using a fiber or a wireless interface that is disposed between the auxiliary device and the base station.

Further, on the basis of the foregoing embodiment, the auxiliary device is user equipment or an auxiliary detection unit, where the auxiliary detection unit is a sending/receiving device that has a capability of detecting the first spectrum.

Further, on the basis of the foregoing embodiment, the auxiliary device communicates with the first base station by using any manner of a radio frequency, a baseband, a Un interface, and an X2 interface.

Further, on the basis of the foregoing embodiment, the receiving module 802 is further configured to obtain the location information of the auxiliary device.

On the basis of the foregoing embodiment, the receiving module 802 is further configured to obtain detection capability information of the auxiliary device, where the detection capability information includes a transmit frequency range and/or a detection type that are/is of the auxiliary device.

On the basis of the foregoing embodiment, the sending module 801 is further configured to send information about whether the spectrum is occupied to a second base station, where the second base station is connected to the first base station.

In this embodiment, it is implemented that a first base station may determine whether user equipment is interfered by another communications system device in a process in which the user equipment uses a first spectrum, so as to implement sharing of a spectrum by the user equipment with the another communications system device.

Figure 10:
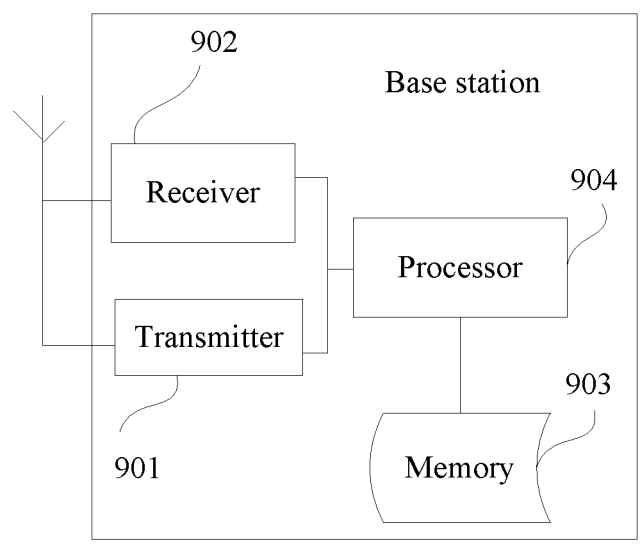
FIG. 10 is a schematic structural diagram of a base station according to an embodiment of the present invention.

FIG. 10 is a schematic structural diagram of a base station according to an embodiment of the present invention. As shown in FIG. 10, the base station includes: a transmitter 901, a receiver 902, a memory 903, and a processor 904 that is separately connected to the transmitter 901, the receiver 902, and the memory 903. The transmitter 901 is configured to send spectrum detection information to an auxiliary device, where the spectrum detection information is used to instruct the auxiliary device to detect whether a first spectrum is occupied. The receiver 902 is configured to receive first spectrum status information sent by the auxiliary device, so that the first base station determines whether the first spectrum in an area in which the auxiliary device is located is occupied.

In this embodiment, a first base station sends spectrum detection information to an auxiliary device, where the spectrum detection information is used to instruct the auxiliary device to detect whether a first spectrum is occupied; then, the first base station receives first spectrum status information sent by the auxiliary device, so that the first base station determines whether the first spectrum in an area in which the auxiliary device is located is occupied, where the first spectrum status information is a message indicating that the auxiliary device detects whether the first spectrum is occupied. Therefore, it is implemented that the first base station may determine whether user equipment is interfered by another communications system device in a process in which the user equipment uses the first spectrum, so as to implement sharing of a spectrum by the user equipment with the another communications system device.

On the basis of the foregoing embodiment, the base station further includes the processor 904, where the processor 904 is specifically configured to: determine, according to the first spectrum status information, that the first spectrum is unoccupied; and then determine first transmit power on the first spectrum according to location information of the auxiliary device.

Further, on the basis of the foregoing embodiment, the receiver 902 is specifically configured to receive the first spectrum status information that is sent by the auxiliary device by means of a scheduling request SR or a dedicated preamble.

On the basis of the foregoing embodiment, the spectrum detection information is carried in broadcast signaling or dedicated signaling.

Further, on the basis of the foregoing embodiment, the first spectrum status information is obtained by the auxiliary device after the auxiliary device detects according to a preset radio frame mode.

On the basis of the foregoing embodiment, the radio frame mode includes at least one radio frame, where the radio frame includes information about whether the first spectrum is available or information indicating that there is an opportunity to use the spectrum.

On the basis of the foregoing embodiment, the transmitter 901 is further configured to: send detection configuration information to the auxiliary device by using a second spectrum, so that the auxiliary device detects the first spectrum; or send detection configuration information to the auxiliary device by using the first spectrum and second transmit power, so that the auxiliary device detects a status of the first spectrum, where the detection configuration information includes at least one or any combination of frequency information, RAT information, a detection type, a detection reporting period, or a detection result reporting trigger threshold; the second power is transmit power that is on the first spectrum and that is obtained by the first base station according to detection performed by the first base station; and the second transmit power is less than or equal to the first transmit power.

Further, on the basis of the foregoing embodiment, the detection configuration information is carried in broadcast signaling or dedicated signaling.

On the basis of the foregoing embodiment, the transmitter 901 is further configured to send a signal by using the second transmit power, where the second transmit power is the transmit power that is on the first spectrum and that is obtained by the first base station according to detection performed by the first base station; the second transmit power is less than or equal to the first transmit power; and the signal includes at least one of a primary synchronization signal PSS, a secondary synchronization signal SSS, a cell-specific reference signal CRS, and a channel state information reference signal CSI-RS.

Further, on the basis of the foregoing embodiment, the transmitter 901 is further configured to send a signal by using the first transmit power, where the signal includes a synchronization signal PSS, a secondary synchronization signal SSS, a cell-specific reference signal CRS, and a channel state information reference signal CSI-RS.

On the basis of the foregoing embodiment, the auxiliary device is disposed within a coverage area or at a coverage edge of a cell to which the first base station corresponds on the first spectrum, or the auxiliary device is disposed within a coverage area of a cell to which the first base station corresponds on the second spectrum or disposed at a coverage edge of the first base station.

Further, on the basis of the foregoing embodiment, the first spectrum status information is obtained by the first base station by using a fiber or a wireless interface that is disposed between the auxiliary device and the base station.

On the basis of the foregoing embodiment, the auxiliary device is user equipment or an auxiliary detection unit, where the auxiliary detection unit is a sending/receiving device that has a capability of detecting the first spectrum.

On the basis of the foregoing embodiment, the auxiliary device communicates with the first base station by using any manner of a radio frequency, a baseband, a Un interface, and an X2 interface.

Further, on the basis of the foregoing embodiment, the receiver 902 is further configured to obtain the location information of the auxiliary device.

On the basis of the foregoing embodiment, the receiver 902 is further configured to obtain detection capability information of the auxiliary device, where the detection capability information includes a transmit frequency range and/or a detection type that are/is of the auxiliary device.

Further, on the basis of the foregoing embodiment, the transmitter 901 is further configured to send information about whether the spectrum is occupied to a second base station, where the second base station is connected to the first base station.

In this embodiment, it is implemented that a first base station may determine whether user equipment is interfered by another communications system device in a process in which the user equipment uses a first spectrum, so as to implement sharing of a spectrum by the user equipment with the another communications system device.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:
1. A shared spectrum detection method, comprising:
sending, by a first base station, a signal by using a second transmit power, wherein the second transmit power is transmit power that is on a first spectrum and that is obtained by the first base station according to detection performed by the first base station; the second transmit power is less than or equal to first transmit power; and the signal comprises at least one of a primary synchronization signal PSS, a secondary synchronization signal SSS, a cell-specific reference signal CRS, and a channel state information reference signal CSI-RS
sending, by the first base station, spectrum detection information to an auxiliary device, wherein the spectrum detection information is used to instruct the auxiliary device to detect whether the first spectrum is occupied;
receiving, by the first base station, first spectrum status information sent by the auxiliary device, so that the first base station determines whether the first spectrum in an area in which the auxiliary device is located is occupied; and
sending, by the first base station, detection configuration information to the auxiliary device by using a second spectrum.
2. The method according to claim 1, wherein the detection configuration information comprises at least one or any combination of frequency information, radio access technology RAT information, a detection type, a detection result reporting period, or a detection result reporting trigger threshold that are of the first spectrum.

3. The method according to claim 1, after the receiving, by the first base station, first spectrum status information sent by the auxiliary device, so that the first base station determines whether the first spectrum in an area in which the auxiliary device is located is occupied, further comprising:
sending, by the first base station, information about whether the spectrum is occupied to a second base station, wherein the second base station is connected to the first base station.

4. A shared spectrum detection method, comprising:
sending, by a first base station, spectrum detection information to an auxiliary device, wherein the spectrum detection information is used to instruct the auxiliary device to detect whether a first spectrum is occupied;
receiving, by the first base station, first spectrum status information sent by the auxiliary device, so that the first base station determines whether the first spectrum in an area in which the auxiliary device is located is occupied;
sending, by the first base station, a signal by using first transmit power, wherein the signal comprises a primary synchronization signal PSS, a secondary synchronization signal SSS, a cell-specific reference signal CRS, and a channel state information reference signal CSI-RS; and
sending, by the first base station, detection configuration information to the auxiliary device by using a second spectrum, wherein the receiving, by the first base station, first spectrum status information sent by the auxiliary device, so that the first base station determines whether the first spectrum in an area in which the auxiliary device is located is occupied comprises:
determining, by the first base station according to the first spectrum status information, that the first spectrum is unoccupied; and
determining, by the first base station, the first transmit power on the first spectrum according to location information of the auxiliary device.

5. The method according to claim 4, wherein the receiving, by the first base station, the first spectrum status information sent by the auxiliary device, so that the first base station determines whether the first spectrum in an area in which the auxiliary device is located is occupied comprises:
receiving, by the first base station, the first spectrum status information that is sent by the auxiliary device by a scheduling request SR or a dedicated preamble.

6. The method according to claim 4, before the determining, by the first base station according to the first spectrum status information, whether the first spectrum in an area in which the auxiliary device is located is occupied, further comprising:
obtaining, by the first base station, detection capability information of the auxiliary device, wherein the detection capability information comprises a transmit frequency range and/or a detection type that are/is of the auxiliary device.

7. A base station, comprising:
a transmitter the transmitter is configured to send spectrum detection information to an auxiliary device, wherein the spectrum detection information is used to instruct the auxiliary device to detect whether a first spectrum is occupied; and
a receiver configured to receive first spectrum status information sent by the auxiliary device, so that the first base station determines whether the first spectrum in an area in which the auxiliary device is located is occupied; wherein
the transmitter is further configured to:
send detection configuration information to the auxiliary device by using a second spectrum; and
send a signal by using second transmit power, wherein the second transmit power is transmit power that is on the first spectrum and that is obtained by the first base station according to detection performed by the first base station; the second transmit power is less than or equal to first transmit power; and the signal comprises at least one of a primary synchronization signal PSS, a secondary synchronization signal SSS, a cell-specific reference signal CRS, and a channel state information reference signal CSI-RS.

8. The base station according to claim 7, further comprising a processor configured to: determine, according to the first spectrum status information, that the first spectrum is unoccupied; and then determine first transmit power on the first spectrum according to location information of the auxiliary device.

9. The base station according to claim 8, wherein the receiver is configured to receive the first spectrum status information that is sent by the auxiliary device by means of a scheduling request SR or a dedicated preamble.

10. The base station according to claim 7, wherein the detection configuration information comprises at least one or any combination of frequency information, RAT information, a detection type, a detection reporting period, or a detection result reporting trigger threshold.

11. The base station according to claim 7, wherein the transmitter is further configured to send a signal by using the first transmit power, wherein the signal comprises a synchronization signal PSS, a secondary synchronization signal SSS, a cell-specific reference signal CRS, and a channel state information reference signal CSI-RS.

12. The base station according to claim 11, wherein the auxiliary device is disposed within a coverage area or at a coverage edge of a cell to which the first base station corresponds on the first spectrum, or the auxiliary device is disposed within a coverage area of a cell to which the first base station corresponds on the second spectrum or disposed at a coverage edge of the first base station.

13. The base station according to claim 7, wherein the transmitter is further configured to send information about whether the spectrum is occupied to a second base station, wherein the second base station is connected to the first base station.

* * * * *